United States Patent Office 3,595,844
Patented July 27, 1971

3,595,844
VANADIUM ORGANOMETALLIC COMPOUNDS AND POLYMERIZATION CATALYSTS THEREOF
James R. Huerta, Adrian, and Jeffrey G. Meyer, Chelsea, Mich., assignors to Dart Industries, Inc., Los Angeles, Calif.
No Drawing. Filed July 31, 1969, Ser. No. 846,614
Int. Cl. C08f 15/40, 15/04; C01b 25/26
U.S. Cl. 260—80.78
22 Claims

ABSTRACT OF THE DISCLOSURE

The reaction product of a sulfur-containing vanadium salt such as vanadyl sulfate and an organophosphate, such as triethyl phosphate, results in a hydrocarbon soluble catalyst component. This component forms an active vanadium coordination catlyst when combined with an organoaluminum halide. The resulting vanadium coordination catalyst is especially useful in the production of "EP" and "EPDM" rubber.

BACKGROUND OF THE INVENTION

(1) Field of the invention

This invention is directed to a novel vanadium organometallic composition of matter and a process for its synthesis, a novel catalyst which includes this composition and a process using the catalyst. More particularly, the invention relates to a hydrocarbon soluble vanadium organometallic compound which when combined with an organoaluminum halide component results in a highly active catalyst for the preparation of polymers of alpha-olefins and copolymers of alpha-olefins, and terpolymers of the alpha-olefins and a nonconjugated diene.

(2) Description of the prior art

Transition metal compounds of various types have been disclosed in the prior art; see U.S. Pats. Nos. 3,113,115 and 3,297,733 and 3,361,779. Of the organometallic compounds disclosed, particular attention has been given to those in which the transition metal constituent is vanadium; see U.S. Pats. Nos. 3,294,828 and 3,361,778. Coordination catalysts containing such prior art vanadium organometallic compounds as vanadium tetrachlorides and vanadium oxytrichlorides, and compounds capable of reducing the vanadium to a valence state of less than 3, such as the organoaluminum compounds, have long been of interest for use as polymerization catalysts; see U.S. Pat. No. 2,862,451. This interest in developing novel vanadium-containing coordination catalysts is evidenced by the considerable number of recent patents on the subject; see, for example, U.S. Pats. Nos. 3,392,160 and 3,396,155 and 3,427,257. Particular attention has been shown in the preparation of alpha-olefin polymers, copolymers of alpha-olefins, e.g., ethylene/propylene (EP) rubber, and the terpolymers of the alpha-olefins with the nonconjugated dienes, e.g., ethylene/propylene/diene terpolymers, (EPDM) rubber. Vanadium coordination catalysts have been disclosed as having activity for the preparation of EP and EPDM rubber; see U.S. Pats. Nos. 3,116,517 and 3,234,383.

SUMMARY OF THE INVENTION

The present invention provides a novel catalyst component comprising the reaction product of a sulfur-containing vanadium salt and an organophosphate compound. The resulting hydrocarbon soluble catalyst component when combined with an organoaluminum halide results in an active vanadium coordination polymerization catalyst. The sulfur-containing salts comprise the vanadium salts of acids containing sulfur and oxygen or the double salts of vanadium sulfates with the sulfates of alkali metals or ammonia. The organophosphate compound has the formula:

wherein R is an alkyl or an alkyl ether having 1 to 16 carbon atoms or an aryl having up to 16 carbon atoms or mixtures thereof. Examples of the vanadium salts of acids containing sulfur and oxygen which are suitable in the synthesis of the vanadium organometallic compounds of this invention include vanadyl sulfate; vanadyl sulfite, vanadyl pyrosulfate, vanadyl thiosulfate and vanadyl pyrosulfite. Examples of the double salts which are also suitable for this synthesis are listed in the table below:

| Name of compound | Formula |
| --- | --- |
| Ammonium divanadyl sulfate | $(NH_4)_2SO_4 \cdot 2VOSO_4 \cdot H_2O$ |
| Potassium divanadyl sulfate | $K_2SO_4 \cdot 2VOSO_4$ |
| Sodium divanadyl sulfate | $Na_2SO_4 \cdot 2VOSO_4 \cdot 2\tfrac{1}{2}H_2O$ |
| Ammonium vanadyl disulfate | $(NH_4)_2SO_4 \cdot VOSO_4 \cdot 3\tfrac{1}{2}H_2O$ |
| Potassium vanadyl disulfate | $K_2SO_4 \cdot VOSO_4 \cdot 3H_2O$ |
| Sodium vanadyl disulfate | $NaSO_4 \cdot VOSO_4 \cdot 4H_2O$ |
| Vanadium trioxydisulfate | $V_2O_3(SO_4)_2$ |
| Vanadium dioxytrisulfate | $V_2O_2(SO_4)_3$ |
| Ammonium vanadium tetroxydisulfate | $[(NH_4)VO_2SO_4 \cdot 2H_2O]_2$ |
| Potassium vanadium tetroxydisulfate | $[KVO_2SO_4 \cdot 3H_2O]_2$ |
| Vanadyl dihydrosulfate | $2(VO)SO_4 \cdot H_2SO_4$ |
| Ammonium vanadous sulfate | $(NH_4)V(SO_4)_2 \cdot 12H_2O$ |
| Sodium vanadous sulfate | $NaV(SO_4)_2 \cdot 12H_2O$ |
| Potassium vanadous sulfate | $KV(SO_4)_2 \cdot 12H_2O$ |
| Vanadous sulfate | $V_2(SO_4)_3$ |

The reaction between the vanadium salt and the organophosphate compound as defined in the above paragraph yields a product which is believed to have a formula at least similar to those formulas included in the equations set forth hereinbelow illustrating the synthesis routes of certain embodiments of the vanadium organometallic compounds of the present invention. However, the exact formulas for the active vanadium organometallic compounds are not critical to this invention. The critical feature of this invention is to produce a vanadium compound or compounds which are highly soluble in the hydrocarbon media used as a diluent in the polymerization of the alpha-olefins and dienes of the type enumerated hereinbelow. It has been found that sulfur-containing vanadium salts per se, e.g., vanadyl sulfate, have little if any polymerization activity when combined with an organoaluminum halide.

One route to synthesize the vanadium organometallic compounds of this invention is to react one mole of vanadyl sulfate with at least two moles of, for example, a trialkyl, trialkyl ether or triaryl phosphate to yield the vanadium organometallic compound of this invention and a side-product of an ether. The route is believed to be represented by the following equation:

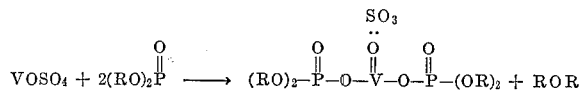

Another route comprises reacting one mole of vanadyl sulfite with at least two moles of the foregoing organophosphate compound to yield the vanadium organometallic compound of this invention and a side-product of an ether as indicated by the following equation:

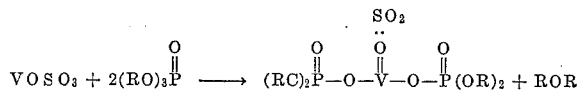

The vanadium organometallic compounds of this invention can also be synthesized by reacting the organophosphate compound as defined above with the reactants used to form the sulfur-containing vanadium salts. For example, it is well known to produce vanadyl sulfate from ammonium meta-vanadate, sulfuric acid and sulfur dioxide. Thus another route to this compound can be represented by the following equation:

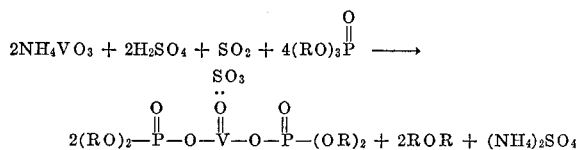

$$2NH_4VO_3 + 2H_2SO_4 + SO_2 + 4(RO)_3\overset{O}{\underset{\|}{P}} \longrightarrow$$

$$2(RO)_2-\overset{O}{\underset{\|}{P}}-O-\overset{SO_3}{\underset{\cdot\cdot}{V}}-O-\overset{O}{\underset{\|}{P}}-(OR)_2 + 2ROR + (NH_4)_2SO_4$$

Similarly the vanadium organometallic components of this invention can be prepared simply by reacting ammonium metavanadate, sulfur dioxide and the organophosphate as defined above as indicated by the following equation:

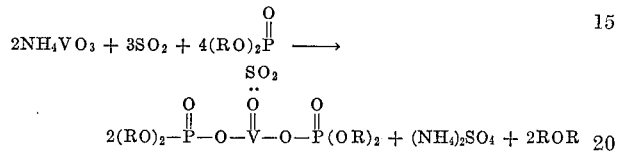

$$2NH_4VO_3 + 3SO_2 + 4(RO)_3\overset{O}{\underset{\|}{P}} \longrightarrow$$

$$2(RO)_2-\overset{O}{\underset{\|}{P}}-O-\overset{SO_2}{\underset{\cdot\cdot}{V}}-O-\overset{O}{\underset{\|}{P}}(OR)_2 + (NH_4)_2SO_4 + 2ROR$$

The vanadium coordination catalysts of this invention are obtained by using the vanadium organometallic-containing reaction product described herein with at least one organoaluminum halide reducing compound in the presence of an inert liquid organic medium. Representative types of organoaluminum compounds include dialkylaluminum monohalides; alkylaluminum dihalides; and aluminum alkyl, cycloalkyl or aryl sesquihalides. Particularly preferred organoaluminum halide compounds in combination with the vanadium organometallic reaction products of this invention include diethylaluminum monochloride and ethylaluminum sesquichloride. Other organoaluminum compounds suitable for the coordination catalyst of this invention include methyl, propyl and isobutyl aluminum chlorides.

Although the relative proportions of the vanadium organometallic component and the organoaluminum halide component can vary widely and one of ordinary skill in the art can readily determine the optimum proportions for specific vanadium and aluminum compounds by routine experimentation, one would generally operate with an Al:V molar ratio in the range of about 1:1 to 20:1.

The vanadium coordination catalysts of this invention are especially useful in the preparation of polymers of ethylene, propylene and similar alpha-olefins having the formula:

R—CH=CH₂ wherein R is hydrogen or a hydrocarbon radical, particularly a saturated alkyl hydrocarbon radical having 1 to 8 carbon atoms, e.g., butene-1; hexene-1; 4-methylpentene-1; heptene-1; 5-methylhexene-1; octene-1; 4-ethylhexene-1; 1-nonene; 1-decene, and dienes, e.g., butadiene and the like. The catalyst of this invention is especially useful in the copolymerization of ethylene and propylene to yield rubbery products and the production of unsaturated, sulfur-vulcanizable, rubbery terpolymers of ethylene and propylene and a nonconjugated diene, e.g., dicyclopentadiene (DCP); methylcyclopentadiene; methylene norbornene (NMB); 1,5-cyclooctadiene; 1,4-hexadiene; or other copolymerizable dienes. The unique features of the vanadium coordination catalyst of this invention are high productivity of the catalyst in terms of the amount of product per pound of catalyst, low cost, ease of handling and storage, and very high solubility in hydrocarbon solvents.

PREFERRED EMBODIMENTS OF THIS INVENTION

In a preferred embodiment of this invention, the vanadium coordination catalyst comprises an admixture of an organoaluminum halide and the reaction product of vanadyl sulfate and the organophosphate compound having the formula set forth above in Summary of the Invention wherein R is an alkyl having 1 to 8 carbon atoms.

The reaction takes place at a temperature in the range of about 50° to 200° C. and at subatmospheric to atmospheric or above for a period of about 5 minutes to several hours. At temperatures below 50° C., little if any reaction takes place and above 200° C. the products have a tendency to decompose. The stoichiometrical minimum molar ratio of the organophosphate compound to the sulfur-containing vanadium salt in the reactants is about 2:1, although the reaction is preferably carried out in the molar range of about 2:1 to 20:1 and even higher and still more preferably in the molar range of about 5:1 to 15:1. An excess amount of the phosphorus compound is employed to keep the vanadium organometallic product in solution.

To obtain the preferred vanadium organometallic component, 1 mole of vanadyl sulfate is reacted with at least 2 moles of trimethyl, triethyl, tripropyl or tributyl phosphate or mixtures thereof at a temperature in the range of 150° to 200° C. and atmospheric pressure for about 1 to 20 hours. The following theoretical equation is believed to best illustrate one embodiment of the present invention employing triethyl phosphate:

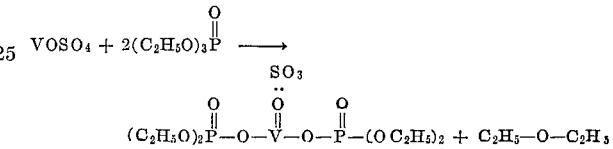

$$VOSO_4 + 2(C_2H_5O)_3\overset{O}{\underset{\|}{P}} \longrightarrow$$

$$(C_2H_5O)_2\overset{O}{\underset{\|}{P}}-O-\overset{SO_3}{\underset{\cdot\cdot}{V}}-O-\overset{O}{\underset{\|}{P}}-(OC_2H_5)_2 + C_2H_5-O-C_2H_5$$

In the preferred embodiment of this invention, the entire reaction product can be used as the vanadium component of the coordination catalyst of this invention because the reaction described in the preceding paragraph takes place at such a rapid rate. This results in very little side-products being formed during the reaction and those that are formed are soluble in the organophosphate, e.g., triethyl phosphate.

It is preferred to separate out the solid residue containing the unreacted vanadium salt from the solution comprising the vanadium organometallic compound dissolved in the organophosphate compound. The large amount of excess organophosphate used in the reaction as well as the volatile side-products, e.g., ethers and any water of hydration that may be present, are preferably stripped or otherwise removed from the reaction product to increase the vanadium content to reasonable levels for polymerization such as at least 0.5% by weight, preferably 5% by weight or higher vanadium content.

In another embodiment of the present invention, the vanadium coordination catalyst comprises an admixture of an organoaluminum halide and the reaction product of one mole of ammonium meta-vanadate with at least one mole of sulfur dioxide and at least two moles of the organophosphate compound having the formula set forth above wherein R is an alkyl having 1 to 8 carbon atoms at the same operating conditions set forth above in connection with the preferred embodiment.

In the case of the embodiment of the preceding paragraph and in the case of other reactions where there is a greater tendency to form insoluble side products, the resulting vanadium organometallic compounds can be separated from the reaction product mixture as a crystalline solid. Such a separation is also desirable even in the case of the preferred embodiment where the synthesis of the vanadium organometallic compound is performed at a location distant from where the polymerization is carried out. To achieve this separation, the reaction product is cooled, the excess solid reactants and isoluble products are removed, for example, by filtration, and the filtrate containing the organophosphate compound and the organometallic compound dissolved therein is stripped, preferably under a vacuum to avoid decomposition of the product. The resultant liquid product that may still contain impurities can then be solubilized in a suitable solvent, filtered, vacuum stripped to remove the solvent and then crystallized to yield a crystalline product. The crystallization takes place by cooling the stripped product or by other known techniques. Suitable solvents for the crystallization of the vanadium organometallic compound of this invention include low boiling paraffinic hydrocarbons such as pentane, hexane, heptane and the like.

Either the solution of the vanadium organometallic or the purified solid crystalline material is then combined in situ in the polymerization reactor with one or more of the organoaluminum halide compounds set forth above in Summary of the Invention. Examples of the preferred organoaluminum halide compound which is combined with the preferred vanadium organometallic compound include ethylaluminum sequichloride and diethylaluminum monochloride in a molar ratio in the range of about 4:1 to 10:1.

Inert liquid organic media, i.e., liquids which do not interefre with the desired polymerization reaction, which are suitably present in the polymerization reactor with the vanadium coordination catalysts of this invention include tetrachloroethylene, aromatic solvents such as benzene, toluene and xylenes; saturated aliphatic hydrocarbon and cycloaliphatic hydrocarbons such as cyclohexane, butane, neopentane, isopentant, n-pentane, cyclopentane, hexane, heptane, methylcyclohexane, 2,2,4-trimethylpentane, octane, and nonane; chlorinated aliphatic hydrocarbons and chlorinated cycloaliphatic hydrocarbons such as carbon tetrachloride, ethyl chloride, methyl chloride, 1,2-dichloroethane and trichloromonofluoromethane; and the organic phosphorus compounds as described above. Particularly effective solvents for the preferred vanadium coordination catalysts of this invention are saturated aliphatic and cycloaliphatic hydrocarbons especially n-hexane, n-heptane, cyclohexane and cycloheptane.

The vanadium coordination catalysts of this invention are employed by contacting them with one or more of the monomers described in Summary of the Invention at subatmospheric to above atmospheric pressure and at a temperature of about $-50°$ C. to $100°$ C. Preferably the conditions for polymerizing these monomers comprise from about atmospheric pressure to about 15 atmospheres and a temperature of about $-5$ to $50°$ C. It has been found for the vanadium coordination catalysts of this invention that at temperatures above $25°$ C. the product yields tend to decrease at pressures in the range of about 25 to 125 p.s.i.g.

The polymerization reaction is arrested and the product is precipitated out of solution by the addition of a non-solvent such as an alcohol. The product is then washed, filtered, and dried. An antioxidant, such as butylated hydroxytoluene, is optionally added to the product prior to the recovery step to avoid its oxidation and degradation.

The polymerization reaction can either be carried out in a batch or continuous operation. In the continuous process, the solvent, vanadium coordination catalyst and monomers are continuously introduced into a polymerization zone which is equipped with means for agitation at a sufficient rate to provide the residence time required for the desired polymer concentration in the reactor effluent.

The vanadium coordination catalyst of this invention are especially useful in the preparation of EP and EPDM rubbers. The ethylene content of these rubbery products ranges from between about 20 and 70 weight percent and correspondingly, the propylene content ranges from between 30 and 80 weight percent. In the case of EPDM, the amount of diene should exceed 1 weight percent of the final product and preferably ranges between about 3 and 30 weight percent. Accordingly, the ethylene and propylene in the final terpolymer ranges between about 70 and 97 weight percent.

The foregoing EP and EPDM rubbers are prepared by reacting, preferably in the presence of hydrogen or other known chain transfer agents, a monomeric mixture of ethylene and propylene comprising from about 20 to 70 weight percent ethylene and 30 to 80 weight percent propylene and, in the case of EPDM rubber, the non-conjugated diene in a reaction zone in the presence of an inert solvent at a temperature of $-5°$ to $50°$ C. with a catalytic amount of one of the vanadium coordination catalysts of this invention.

The examples below illustrate the methods of preparation of some of the embodiments of the present invention and their use in polymerization.

EXAMPLE 1

Preparation of solid vanadium organometallic catalyst component from vanadyl sulfate The vanadium organometallic catalyst component was prepared by charging 19.9 grams (0.122 mole) of vanadyl sulfate and 91 grams (0.5 mole) of triethyl phosphate to a glass-bowl reactor equipped with a reflux condenser, stirrer and thermometer. The reactants were heated to reflux temperatures of about $200°$ C. and held at this temperature under atmospheric pressure for about one hour. After the resulting product mixture was cooled to room temperature, 8.3 grams of the excess vanadyl sulfate were filtered off, representing about 58% by weight conversion of the vanadium in the reaction mixture to the desired product. The filtrate was vacuum stripped at 10 mm. Hg and $130°$ C. to yield 25 grams of solid residue. Recrystallization of this solid residue from benzene produced light blue prismatic crystals having a vanadium content of 9.3 weight percent (11.24% theoretical).

EXAMPLE 2

Use of solid vanadium organometallic catalyst component of Example 1 in preparation of EP rubber at $25°$ C.

A stirred glass-bowl reactor was charged with 30 p.s.i. of ethylene, 1300 cc. of heptane and 320 cc. of liquid propylene. During the course of the reaction, 0.45 gram of the vanadium organometallic compound obtained from Example 1 dissolved in 30 cc. of benzene and 1.2 grams of ethylaluminum sesquichloride dissolved in 30 cc. of n-heptane were continuously metered into the reactor. The reaction mixture was maintained at a temperature of $25°$ C. and a constant pressure of 60 p.s.i.g. with a gas mixture comprising 60 mole percent ethylene and 40 mole percent propylene. The reaction was terminated and the ethylene/propylene copolymer was precipitated out of solution by the addition of an excess amount of isopropyl alcohol after a total reaction time of 35 minutes. The resulting copolymer product was filtered, dried and weighed. The yield of the ethylene/propylene copolymer product was 85 grams. This yield corresponds to a productivity of about 189 grams of polymer product per gram of the solid vanadium organometallic compound of this invention or about 2,030.0 grams of polymer product per gram of vanadium.

EXAMPLE 3

Use of vanadium tetrachloride in the preparation of EP rubber at $25°$ C. as a control A control run was made at the identical operating conditions as described under Example 2, above except that in place of the vanadium organophosphate catalyst component of this invention, vanadium tetrachloride ($VCl_4$) was employed in an amount of 0.16 gram dissolved in 30 cc. of benzene. The difference in the amount of the vanadium organophosphate employed versus that of the vanadium tetrachloride was the amount necessary to put the two catalysts on the basis of equivalent vanadium contents. The yield of the ethylene/propylene copolymer product for the control run was 106 grams.

EXAMPLE 4

Use of solid vanadium organometallic catalyst component of Example 1 in preparation of EP rubber at 40° C.

Example 2 above was repeated except that the reaction temperature was increased to 40° C. The yield when operating with the catalyst of this invention was 44 grams.

EXAMPLE 5

Preparation of a solution of vanadium organometallic catalyst component from vanadyl sulfate 39.8 grams (0.244 mole) of vanadyl sulfate and 364 grams (2.0 moles) of triethyl phosphate were charged to a 1 liter reactor equipped with a reflux condenser, mechanical stirrer and thermometer. The reactants were heated to 137° C. and held at this temperature under atmospheric pressure for about 20 minutes during which time the vanadyl sulfate appeared to go into solution. The temperature in the reactor was lowered to 90° C. for 2 hours and the resulting product was filtered without yielding a residue. The liquid product mixture was partially stripped under a vacuum of 10 mm Hg and a temperature of 130° C. to remove 90% by weight of the excess triethyl phosphate. Benzene was added to the partially stripped reaction product and the resulting solution was filtered at room temperature. The resulting filtrate was vacuum stripped at the above conditions to yield 105.8 grams of dark green liquid which contained about 5.3% by weight vanadium.

EXAMPLE 6

Use of the solution of vanadium organometallic catalyst component of Example 5 in preparation of EP rubber at 25° C.

The same procedure was followed in this run that was used in Example 2 except that 0.79 gram of the dark green solution of the organometallic compound of Example 5 dissolved in 30 cc. of benzene were used. The difference in the amount of the solution of the catalyst component used in this example versus that of the solid vanadium organophosphate catalyst component used in Example 2 was the amount necessary to put them on an equivalent vanadium content. The yield of the vanadium coordination catalyst of this invention was 84 grams. This yield corresponds to about the same productivity as that of the vanadium organometallic catalyst component of Example 2.

EXAMPLE 7

Preparation of a solution of vanadium organometallic catalyst component with great excess of triethyl phosphate 400 grams (2.45 moles) of vanadyl sulfate and 6,000 (32.9 moles) grams of triethyl phosphate were charged to a 12 liter reactor equipped with a reflux condenser, mechanical stirrer and thermometer. The reactants were heated to 130° C. and held at this temperature under atmospheric pressure for about 3 hours. The reaction product mixture was partially stripped under a vacuum of 10 mm. Hg to remove 4,000 grams of excess triethyl phosphate. The partially stripped reaction product mixture was cooled to room temperature and filtered to remove 84.4 grams of a green precipitate. The resulting filtrate was vacuum stripped at the above conditions to remove an additional 1,000 grams of triethyl phosphate. The final reaction product mixture was a clear, dark blue, slightly viscous liquid weighing about 1220 grams and containing 7.07% by weight vanadium. An analysis of the final liquid product mixture showed that it contained about 63% by weight of the crystalline solid of the type produced in Example 1 dissolved in excess triethyl phosphate. The characteristic light blue prismatic crystals were precipitated out on cooling this mixture to 0° C. The crystals dissolved on reheating to room temperature.

EXAMPLE 8

Use of the solution of vanadium organometallic catalyst component of Example 7 in preparation of EP rubber at 25° C.

The same procedure was followed in this run that was used in Example 2 except that 0.59 gram of the final liquid product mixture of Example 7 containing the vanadium organometallic compound dissolved therein diluted with 30 cc. of benzene were used. The difference in the amount of the solution of catalyst component used in this example versus that of the solid vanadium organophosphate catalyst component used in Example 2 was the amount necessary to put them on an equivalent vanadium content. The yield of the vanadium coordination catalyst of this invention was 91 grams. This yield corresponds to a productivity of about 245 grams of polymer product per gram of the solid vanadium organometallic compound of this invention or about 21,800 grams of polymer product per gram of vanadium.

EXAMPLE 9

Use of vanadyl sulfate as a catalyst component in preparation of EP rubber at 25° C. as a control 0.16 gram of vanadyl sulfate slurried with 30 cc. of mineral oil were used in place of the hydrocarbon soluble vanadium organometallic compound of this invention and the procedure of Example 2 was followed to yield only a trace of EP rubber product.

EXAMPLE 10

Use of the solution of vanadium organometallic component of Example 7 in the preparation of EPDM rubber in a continuous run A feed vessel was charged with 2250 cc. of n-heptane and 2.8 grams of ehtylaluminum sesquichloride. A glass-bowl reactor was flushed with ethylene and charged with 30 p.s.i. of ethylene, 750 cc. of the mixture from the feed vessel and 300 cc. of liquid propylene. A continuous feed stream of ENB dissolved in 30 cc. of n-heptane and the final liquid product mixture of Example 7 diluted with 30 cc. of benzene were continuously added during the course of this continuous run in the presence of hydrogen at a pressure of about 100 p.s.i.g. and at a temperature of 25° C. After a 30 minute initiation period, the liquid level in the reactor was maintained at 1300 cc. by slowly discharging the contents.

The total reaction time for the continuous run was 90 minutes. The total feed added during this period and the resulting EPDM rubber properties are indicated in Table I below:

TABLE I

Total feed:
- Solution of vanadium catalyst component—0.52 gram
- Ethylaluminum sesquichloride—2.8 grams
- Hydrogen—4.5 liters
- Ethylene—99 liters
- Propylene—900 cc.
- Ethylidene norbornene—18 cc.
- n-Heptane—2250 cc.

EPDM product:
- Yield—143 grams
- Productivity—435 grams product/gm. solid catalyst

EXAMPLE 11

Preparation of solid vanadium organometallic catalyst component from ammonium metal vanadate and sulfur dioxide To a one liter reactor equipped with a condenser, mechanical stirrer and an adapter for gas addition were added 46.8 grams (0.4 mole) of ammonium meta vanadate ($NH_4VO_3$) and 728.8 grams (4 moles) of triethyl phosphate. Sulfur dioxide was continuously purged into the reactor for a period of about 9 hours. The temperature of the reactants was held at about 48° C. for about ½ hour and then in the range of about 55 to 70° C. for about 4 hours whereupon the reaction mixture turned from a light green to yellow. The mixture was maintained in the range of 75° to 87° C. for 5 hours without visible change in the color of the reactants and the SO₂ purge was terminated. The reaction mixture was then held at 110° C. for an additional 3 hour period to result in a brown mixture. The resulting product mixture was filtered to yield 50 grams of solid residue and 688.5 grams of light green filtrate. The filtrate was vacuum stripped at 10 mm. Hg and about 120° C. to yield a thick syrup. 500 ml. of n-heptane were added to the thick syrup from which were recovered 26.2 grams of green solids. The solid residue was dissolved in 1 liter of benzene and the resulting solution was heated to 60° C. and held at this temperature for 1 hour. The benzene was stripped to produce an additional 13.3 grams of green solids crystals which were recrystallized in benzene. A portion of the green solids was recrystallized from n-heptane to yield the same blue prismatic crystals, characteristic of the vanadium organometallic catalyst component produced by the procedure of Example 1.

The foregoing examples have illustrated the alternate routes to the synthesis of hydrocarbon soluble vanadium organometallic catalyst components and their use in active vanadium coordination polymerization catalysts. These components have been shown to be highly effective whether employed in a solution of the organophosphate or as a crystalline solid.

What is claimed is:
1. A process for producing a catalyst composition which comprises the following steps:
 (a) reacting one mole of vanadyl sulfate with at least two moles of an organophosphate of trimethyl, triethyl, tripropyl, tributyl or mixtures thereof at a temperature in the range of 150° to 200° C.;
 (b) separating out the insoluble solid residue from the resulting reaction product mixture;
 (c) recovering a liquid phase comprising a vanadium organometallic compound dissolved in said organophosphate; and
 (d) combining an organoaluminum chloride with said liquid phase in an Al:V molar ratio in the range of about 4:1 to 10:1.

2. The process of claim 1 wherein said organoaluminum chloride is dialkylaluminum monochloride, alkylaluminum dichloride, aluminum alkyl sesquichloride, aluminum cycloalkyl sesquichloride or mixtures thereof and wherein the alkyl of said organoaluminum chloride has 1 to 4 carbon atoms.

3. A composition of matter comprising the combination of an organoaluminum halide with the reaction product of:
 (a) a vanadium salt of acids containing sulfur and oxygen or the double salts of vanadium sulfates with the sulfates of alkali metals or ammonia,
 (b) an organophosphate compound having the formula:

wherein R is an alkyl having 1 to 16 carbon atoms, an alkyl ether having 1 to 16 carbon atoms, an aryl having up to 16 carbon atoms or mixtures thereof.

4. The composition of claim 3 wherein the Al:V molar ratio is in the range of about 1:1 to 20:1.

5. A process for preparing polymers of at least one alpha-olefin which comprises reacting said alpha-olefin in the presence of a solvent at a temperature of about −50° to 100° C. with a catalystic amount of the catalyst composition comprising the combination of organoaluminum halide with the reaction product of:
 (a) a vanadium salt of acids containing sulfur and oxygen or the double salts of vanadium sulfates with the sulfates of alkali metals or ammonia,
 (b) an organophosphate compound having the formula:

wherein R is an alkyl having 1 to 16 carbon atoms, an alkyl ether having 1 to 16 carbon atoms, an aryl having up to 16 carbon atoms or mixtures thereof.

6. The process of claim 5 wherein said alpha-olefin is ethylene, propylene, or mixtures thereof.

7. A process for preparing a polymer which comprises reacting a mixture comprising about 70 to 99% by weight of at least one alpha-olefin and about 1 to 30% by weight of at least one non-conjugated diene in the reaction zone in the presence of an inert solvent at a temperature of about −5° to 50° C. with a catalytic amount of the catalyst composition comprising the combination of organoaluminum halide with the reaction product of:
 (a) a vanadium salt of acids containing sulfur and oxygen or the double salts of vanadium sulfates with the sulfates of alkali metals or ammonia,
 (b) an organophosphate compound having the formula:

wherein R is an alkyl having 1 to 16 carbon atoms, an alkyl ether having 1 to 16 carbon atoms, an aryl having up to 16 carbon atoms or mixtures thereof.

8. A process for preparing a terpolymer of ethylene/propylene/diene monomers which comprises reacting a monomeric mixture comprising from about 20 to about 70 parts by weight of ethylene, from about 30 to 80 parts by weight of propylene and from 1 to about 30 parts by weight of a nonconjugated diene in a reaction zone in the presence of an inert solvent at a temperature of about −5° to 50° C. with a catalytic amount of the catalyst composition comprising the combination of organoaluminum halide with the reaction product of:
 (a) a vanadium salt of acids containing sulfur and oxygen or the double salts of vanadium sulfates with the sulfates of alkali metals or ammonia,
 (b) an organophosphate compound having the formula:

wherein R is an alkyl having 1 to 16 carbon atoms, an alkyl ether having 1 to 16 carbon atoms, an aryl having up to 16 carbon atoms or mixtures thereof.

9. A process for producing a catalyst composition which comprises reacting one mole of a vanadium salt of acids containing sulfur and oxygen or the double salts of vanadium sulfates with the sulfates of alkali metals or ammonia with at least 2 moles of an organophosphate compound having the formula:

wherein R is an alkyl having 1 to 16 carbon atoms, an alkyl ether having 1 to 16 carbon atoms, an aryl having up to 16 carbon atoms or mixtures thereof at a temperature in the range of about 50° to 200° C. and combining the resulting reaction product with an organoaluminum halide.

10. The process of claim 9 wherein the Al:V molar ratio of said catalyst composition is 1:1 to 20:1.

11. The process of claim 9 wherein said vanadium salt is vanadyl sulfate.

12. The process of claim 9 wherein R of said organophosphate compound is an alkyl having 1 to 8 carbon atoms.

13. The process of claim 12 wherein R is ethyl.

14. The process of claim 9 wherein said alpha-olefin is ethylene, propylene, or mixtures thereof.

15. A process for preparing polymers of at least one alpha-olefin which comprises reacting said alpha-olefin in the presence of a solvent at a temperature of about −50° to 100° C. with a catalytic amount of said catalyst composition comprising the reaction product of one mole of a vanadium salt of acids containing sulfur and oxygen or the double salts of vanadium sulfates with the sulfates of alkali metals or ammonia and at least 2 moles of an organophosphate compound having the formula:

wherein R is an alkyl having 1 to 16 carbon atoms, an alkyl ether having 1 to 16 carbon atoms, an aryl having up to 16 carbon atoms or mixtures thereof at a temperature in the range of about 50° to 200° C. and combining the resulting reaction product with an organoaluminum halide.

16. A process for preparing a polymer which comprises reacting a mixture comprising about 70 to 99% by weight of at least one alpha-olefin and about 1 to 30% by weight of at least one nonconjugated diene in the reaction zone in the presence of an inert solvent at a temperature of about −5° to 50° C. with a catalytic amount of said catalyst composition comprising the reaction product of one mole of a vanadium salt of acids containing sulfur and oxygen or the double salts of vanadium sulfates with the sulfates of alkali metals or ammonia and at least 2 moles of an organophosphate compound having the formula:

wherein R is an alkyl having 1 to 16 carbon atoms, an alkyl ether having 1 to 16 carbon atoms, an aryl having up to 16 carbon atoms or mixtures thereof at a temperature in the range of about 50° to 200° C. and combining the resulting reaction product with an organoaluminum halide.

17. A process for preparing a terpolymer of ethylene/propylene/diene monomers which comprises reacting a monomeric mixture comprising from about 20 to about 70 parts by weight of ethylene, from about 30 to about 80 parts by weight of propylene and from about 1 to about 30 parts by weight of a nonconjugated diene in a reaction zone in the presence of an inert solvent at a temperature of about −5° to 50° C. with a catalytic amount of said catalyst composition comprising the reaction product of one mole of a vanadium salt of acids containing sulfur and oxygen or the double salts of vanadium sulfates with the sulfates of alkali metals or ammonia and at least 2 moles of an organophosphate compound having the formula:

wherein R is an alkyl having 1 to 16 carbon atoms, an alkyl ether having 1 to 16 carbon atoms, an aryl having up to 16 carbon atoms or mixtures thereof at a temperature in the range of about 50° to 200° C. and combining the resulting reaction product with an organoaluminum halide.

18. A process for preparing an ethylene/propylene copolymer which comprises reacting a monomeric mixture comprising from about 20 to about 70 weight percent ethylene and from 30 to about 80 weight percent propylene in a reaction zone in the presence of an inert solvent at a temperature of about −5° to 50° C. with a catalytic amount of the catalyst composition produced by the catalyst composition produced by the following steps:

(a) reacting one mole of vanadyl sulfate with at least two moles of an organophosphate of trimethyl, triethyl, tripropyl, tributyl or mixtures thereof at a temperature in the range of 150° to 200° C.;

(b) separating out the insoluble solid residue from the resulting reaction product mixture;

(c) recovering a liquid phase comprising a vanadium organometallic compound dissolved in said organophosphate; and (d) combining an organoaluminum chloride with said liquid phase in an Al:V molar ratio in the range of about 4:1 to 10:1.

19. A process for preparing a terpolymer of ethylene/propylene/diene monomers which comprises reacting a monomeric mixture comprising from about 20 to about 70 parts by weight of ethylene, from about 30 to about 80 parts by weight of propylene and from about 1 to about 30 parts by weight of a nonconjugated diene in a reaction zone in the presence of an inert solvent at a temperature of about −5° to 50° C. with a catalytic amount of the catalyst composition produced by the following steps:

(a) reacting one mole of vanadyl sulfate with at least two moles of an organophosphate of trimethyl, triethyl, tripropyl, tributyl or mixtures thereof at a temperature in the range of 150° to 200° C.;

(b) separating out the insoluble solid residue from the resulting reaction product mixture;

(c) recovering a liquid phase comprising a vanadium organometallic compound dissolved in said organophosphate; and (d) combining an organoaluminum chloride with said liquid phase in an Al:V molar ratio in the range of about 4:1 to 10:1.

20. A process for producing a catalyst composition which comprises the following steps:

(a) reacting one mole of ammonium metavanadate with at least one mole of sulfur dioxide and at least four moles of an organophosphate compound having the formula:

wherein R is an alkyl having 1 to 16 carbon atoms, an alkyl ether having 1 to 16 carbon atoms, an aryl having up to 16 carbon atoms or mixtures thereof at a temperature in the range of about 50° to 200°C.;

(b) separating out the insoluble solid residue from the resulting reaction product mixture;

(c) recovering a liquid phase comprising a vanadium organometallic compound dissolved in said organophosphate compound; and (d) combining the component recovered from step (c) with an organoaluminum halide.

21. The process of claim 20 wherein the Al:V molar ratio of said catalyst composition is 1:1 to 20:1.

22. The process of claim 20 wherein R of said organophosphate compound is ethyl.

References Cited

UNITED STATES PATENTS 3,427,257 2/1969 Bayer et al. _____ 252—431(P)
3,488,334 1/1970 Bayer et al. ___ 260—94.9X(C)

JOSEPH L. SCHOFER, Primary Examiner
A. HOLLER, Assistant Examiner

U.S. Cl. X.R.

252—431P, 437; 260—88.2E, 93.1, 93.7, 94.9CB